(12) United States Patent
Perlo et al.

(10) Patent No.: US 6,976,653 B2
(45) Date of Patent: Dec. 20, 2005

(54) VTOL MICRO-AIRCRAFT

(75) Inventors: Piero Perlo, Sommariva Bosco (IT); Denis Bollea, Fiano (IT); Roberto Finizio, Orbassano (IT); Cosimo Carvignese, Orbassano (IT); Elena Balocco, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 223 days.

(21) Appl. No.: 10/626,697

(22) Filed: Jul. 25, 2003

(65) Prior Publication Data

US 2004/0129833 A1 Jul. 8, 2004

(30) Foreign Application Priority Data

Jul. 24, 2002 (IT) .................................... TO2002A0667

(51) Int. Cl.[7] .......................... B64C 27/20; B64C 27/26
(52) U.S. Cl. .................... 244/12.2; 244/7 A; 244/34 A
(58) Field of Search ................................ 244/7 A, 7 B, 244/12.2, 12.3, 12.5, 34 A, 45 R

(56) References Cited

U.S. PATENT DOCUMENTS

| 3,002,709 | A | * | 10/1961 | Cochran | ..................... 244/12.2 |
| 3,584,810 | A | | 6/1971 | Velton | |
| 5,071,383 | A | | 12/1991 | Kinoshita | |
| 5,150,857 | A | * | 9/1992 | Moffitt et al. | ............... 244/12.2 |
| 5,297,759 | A | | 3/1994 | Corsiglia et al. | |
| 6,170,778 | B1 | * | 1/2001 | Cycon et al. | ................... 244/6 |
| 6,691,949 | B2 | * | 2/2004 | Plump et al. | ............... 244/12.2 |

FOREIGN PATENT DOCUMENTS

EP 0 661 206 A1 7/1995

* cited by examiner

Primary Examiner—Robert P. Swiatek
(74) Attorney, Agent, or Firm—Sughrue Mion, PLLC

(57) ABSTRACT

VTOL micro-aircraft comprising a first and a second ducted rotor mutually aligned and distanced according to a common axis and whose propellers are driven in rotation in mutually opposite directions. Between the two ducted rotors are positioned a fuselage and a wing system formed by wing profiles forming an X or an H configuration and provided with control flaps.

11 Claims, 6 Drawing Sheets

ARRANGEMENT 1

ARRANGEMENT 2

VTOL MICRO-AIRCRAFT

FIELD OF THE INVENTION

The present invention relates to a VTOL micro-aircraft, i.e. with Vertical Take-Off and Landing, having a new and original configuration able to allow it to have a very high flexibility of use in a multiplicity of fields of application without a pilot aboard.

SUMMARY OF THE INVENTION

The VTOL micro-aircraft according to the invention is essentially characterised in that it comprises:

a first ducted rotor and a second ducted rotor, mutually aligned and distanced according to a common axis and each including a propeller rotatable within a respective annular cowling, a fuselage positioned along said common axis between said first and second rotor and bearing said propellers at its ends, first and second motorised means positioned at said ends of the fuselage to drive the propellers of said first and second rotor in mutually opposite directions of rotation, a wing system positioned radially between said fuselage and said first and second rotor, and control means.

The aircraft according to the invention is able to fly in remote mode and has such dimensions as to allow its use in a multiplicity of possible applications with particular reference to control, surveillance, monitoring, communication functions and the like.

According to a preferred embodiment of the invention, the wing system includes wing profiles forming an "X" configuration. Conveniently, said wing profiles interconnect the fuselage and the annular cowlings of the first and of the second rotor, and may also include at least an additional wing profile positioned within the aforesaid X configuration.

BRIEF DESCRIPTION OF THE DRAWINGS

Further features and advantages of the invention shall become readily apparent from the detailed description that follows with reference to the accompanying drawings, provided purely by way of non limiting example, in which.

DETAILED DESCRIPTION OF THE INVENTION

Figure 1:
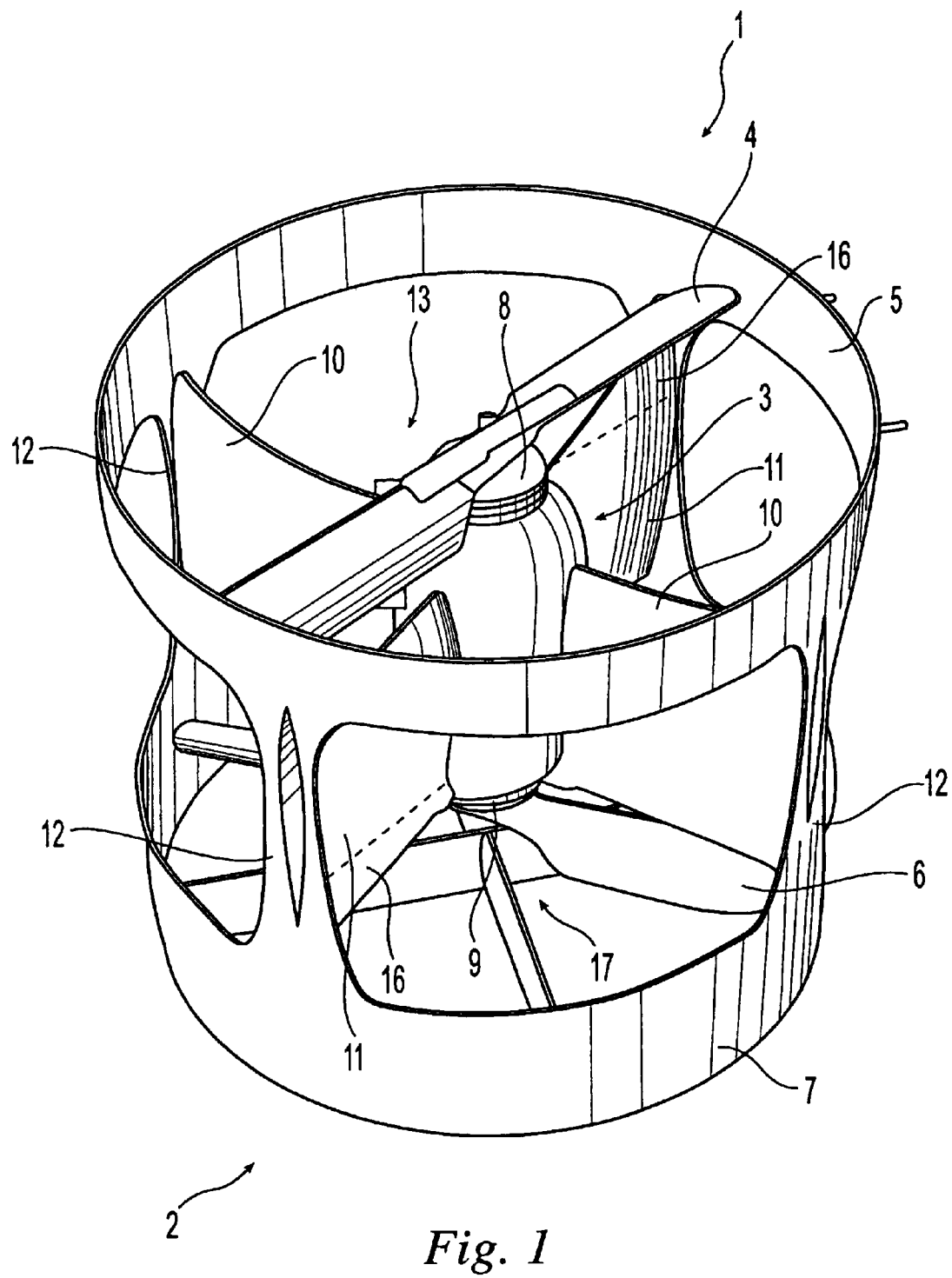
FIG. 1 is a schematic perspective view of a VTOL micro-aircraft according to the invention.
Figure 2:
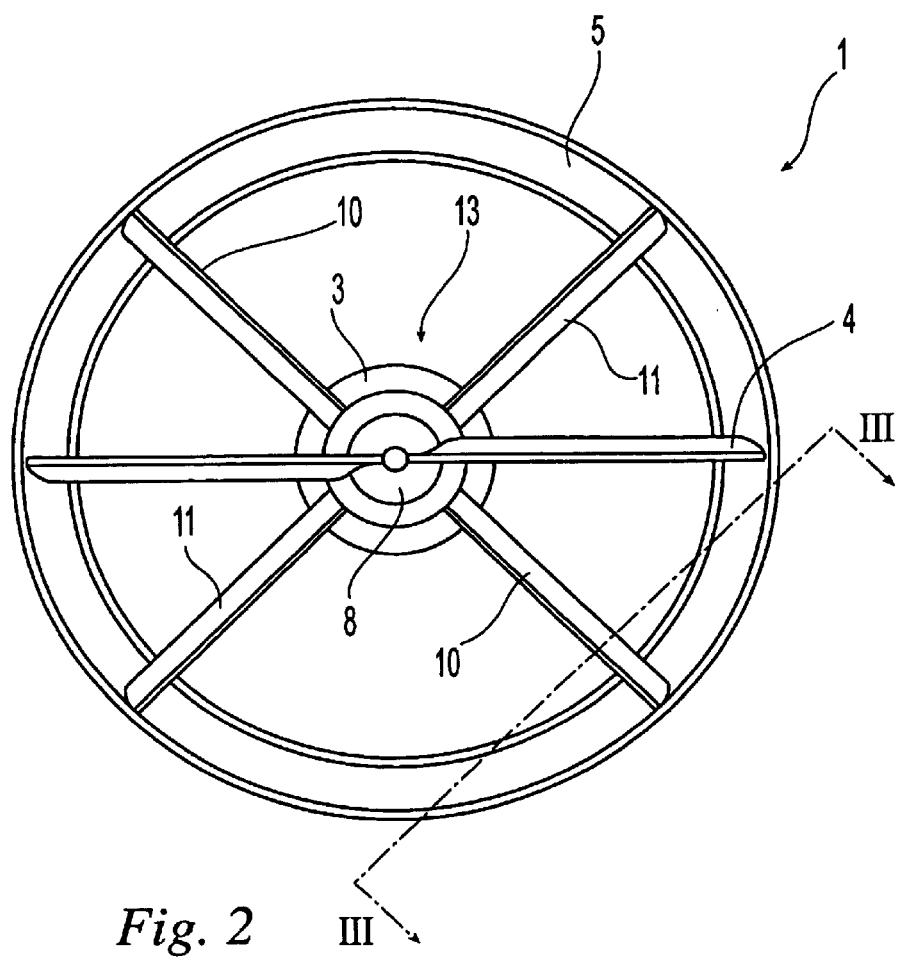
FIG. 2 is a top plan view of FIG. 1.
Figure 3:
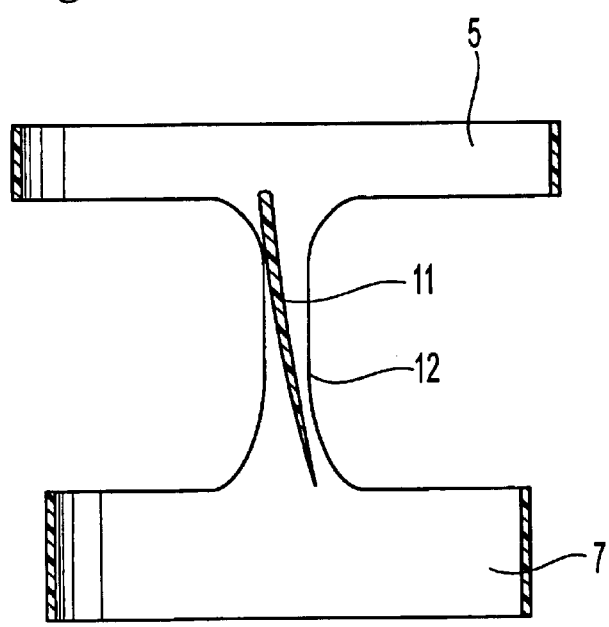
FIG. 3 is a section view according to the line III—III of FIG. 2.

With initial reference to FIGS. 1 through 3, a VTOL micro-aircraft according to a first embodiment of the invention essentially comprises a first ducted rotor 1 and a second ducted rotor 2 mutually aligned and distanced according to a common axis which, in the depiction of FIG. 1, is positioned vertically.

The reference number 3 generically designates a fuselage positioned according to the common axis of the two ducted rotors 1, 2 and connected thereto in the manner clarified below.

The first ducted rotor 1 consists of a propeller 4 able to rotate within a circular shaped annular cowling 5 whose inner diameter is slightly greater than the longitudinal dimension of the propeller 4.

Similarly, the second ducted rotor 2 includes a propeller 6 able to rotate within a circular shaped annular cowling 7 whose inner diameter is slightly greater than the longitudinal dimension of the propeller 6.

The two ducted rotors 1,2 can have equal or different radial and axial dimensions.

The shape of the propellers 4 and 6 is optimized in order to generate the best possible thrust. Moreover, the two propellers 4 and 6 advantageously have different profiles in order to optimize thrust according to the airflows on the propellers themselves: the first propeller 4 receives air whose velocity is equal to the velocity of advance of the aircraft, whilst the second propeller 6 also receives the air exiting the first propeller 4, which tends to spin onto itself because of the rotation imparted by the propeller.

The annular cowlings 5 and 7 can also have mutually different profiles and their shape and thickness are optimized in order to minimize air resistance.

The choice of the ducted rotors 1 and 2 is linked to the advantages of this configuration with respect to the case of non ducted propellers, both in terms of operating noise reduction, and for the purposes of the protection due to the fact that the propellers 4 and 6 are confined within respective rigid structures 5, 7 and permit reduction of the overall dimensions of the aircraft for the same thrust developed by the ducted rotors relative to free propellers. Moreover, the cascade coupling of the two ducted rotors 1, 2 increases thrusting efficiency relative to total power developed. By way of indication, the two ducted rotors 1, 2 axially distanced from each other are more efficient (about 40% less power required) than a system with counter-rotating blades of a same ducted rotor.

The propellers 4, 6 are commanded to rotate in opposite directions to eliminate the twisting moments generated in operation. To drive the propellers 4, 6, respective motors are provided, conveniently of the electric type, for instance able to develop a power in the order of 5–10 W each and to drive the rotation of the respective propellers at 4,000–5,000 rpm. The motors, schematically indicated as 8 and 9, are housed at the ends of the fuselage 3 and could also be constituted by combustion engines, particularly micro-combustors with ink-jet injection (i.e. of the kind used in ink-jet printers to eject ink droplets).

Figure 8:
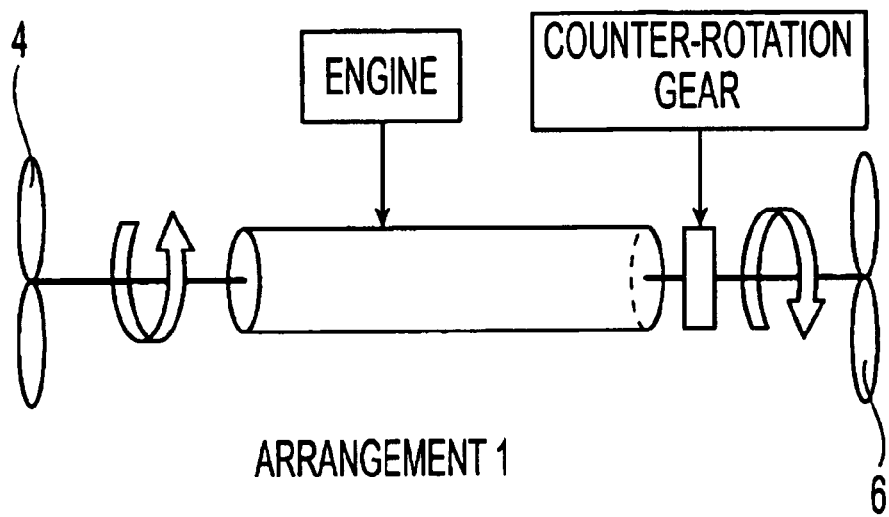
FIG. 8 shows, in diagram form, two alternative solutions for the motorisation of the aircraft according to the invention with one or two rotary engines, respectively.
Figure 8:
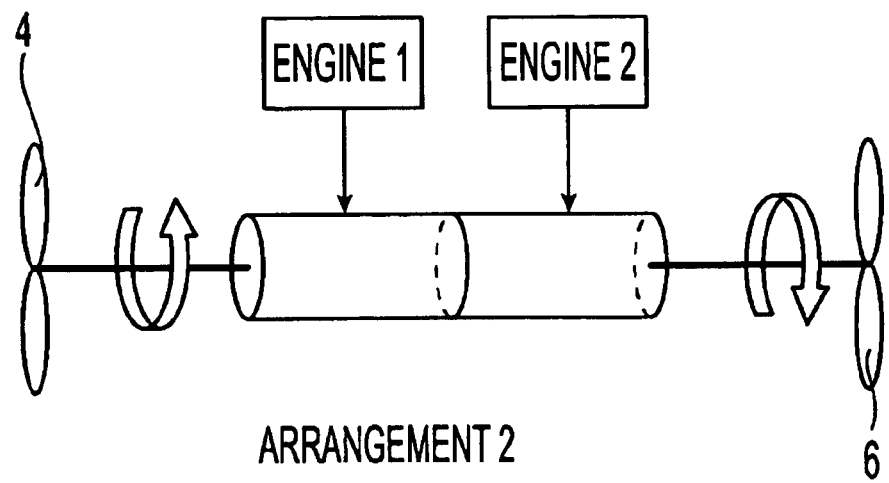

Among the other internal combustion engines usable to drive the propellers 4, 6 of the two ducted rotors 1, 2, micro-engines of the Wankel type (i.e. rotary) can also be used according to one or the other of the two alternative arrangements shown in FIG. 8. The first arrangement provides for a single motor or engine which drives both propellers 4, 6, one directly and the other one through a counter-rotating gearwheel mechanism, whilst the second arrangement provides for the use of two motors or engines in line.

The motors can be supplied power by means of solar cells or with lithium battery packs, or a combination thereof.

The possible electrical batteries, or the fuel tank in the case of internal combustion engines, are housed within the fuselage 3, as are the aircraft control electronics, described below.

The profile of the fuselage 3 is the proper compromise between a good aerodynamic shape and a sufficiently large compartment to contain the aforementioned components. In the case of the illustrated embodiment, the surface of the fuselage 3 is generally teardrop shaped in such a way as to convey flows from the first ducted rotor 1 to the second ducted rotor 2 (Coanda effect) improving the overall efficiency of the device.

Figure 9:
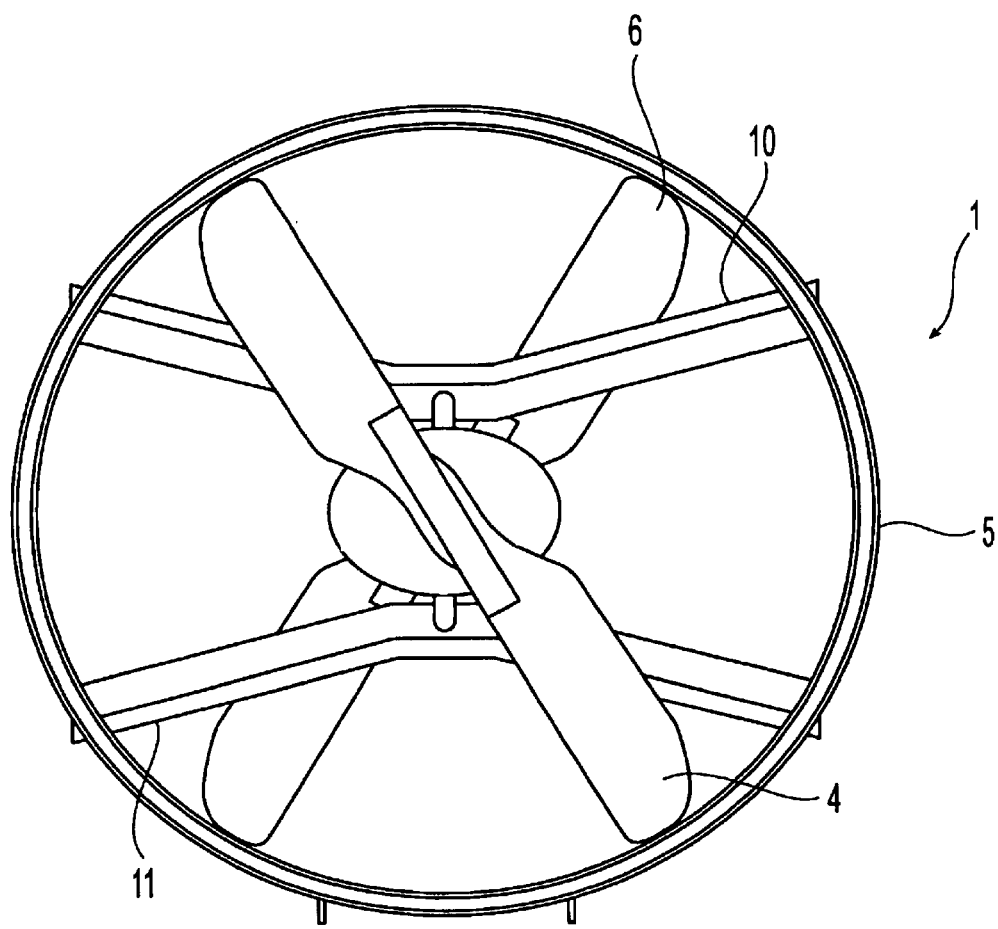
FIG. 9 shows a variation of FIG. 2.

Between the fuselage 3 and the two ducted rotors 1, 2 is radially positioned a wing system, generically designated with the reference number 9, which also serves as a connecting structure. In the case of the embodiment described herein, the wing system includes two pairs of wing profiles 10, 11 forming an X configuration (FIGS. 1–3) or an H configuration (FIG. 9). The inclination of the wind profiles 10, 11 with the horizontal flight plane can vary between 15° and 30°, to optimise the system and assure the best flight performance.

This type of configuration allows to maximize available wing surface area, reducing the stalling speed of the aircraft, thereby allowing it to fly even at low speeds. Moreover, this configuration enables to improve flows between the first and the second ducted rotors 1, 2 because the rotation of the airflows of the first propeller 4 is hindered and they are correctly conveyed onto the second propeller 6.

Each profile 10, 11 is of appropriate shape, symmetrical or asymmetrical, is connected to the fuselage 3 directly or by means of supports, structured aerodynamically to offer less resistance to lateral wind gusts, and is able to generate maximum lift in order to lift the aircraft off the ground during take off and to assure horizontal flight.

The angle of attack of the wing profiles 10, 11 is the optimal one, able to assure the best ratio between lift and drag (maximum $C_l/C_d$). For instance, using a symmetrical NACA 0009 profile, optimal angle of attack is around 6°–8°.

The wing profiles 10, 11 are appropriately shaped not to interfere with the propellers, in order to minimise drag and not to alter airflows. Moreover, the surfaces of the wing profiles 10, 11 convey the airflows "attaching" them to the surfaces themselves (Coanda effect).

Conveniently the wing profiles 10, 11 can have a hollow structure in order both to reduce the total weight of the aircraft, and to house a payload constituted for instance by electronic boards for controlling and operating the aircraft.

Moreover, the surfaces of the wing profiles 10, 11, but also the surfaces of the cowlings 5, 7 of the two ducted rotors 1, 2 can be lined with organic film solar cells having a weight of one gram per $dm^2$ and a total efficiency of around 7%. Alternatively, the same surfaces can be built directly with contoured silica wafers, and in this case efficiency could reach up to 20%.

The wing profiles 10, 11 are joined in correspondence with the respective ends radially internal to the fuselage 3, and in correspondence with the respective ends radially external to the cowlings 5 of the two ducted rotors 1, 2, directly or by means of axial connecting baffle plates 12 between said cowlings 5 and 7.

Figure 4:
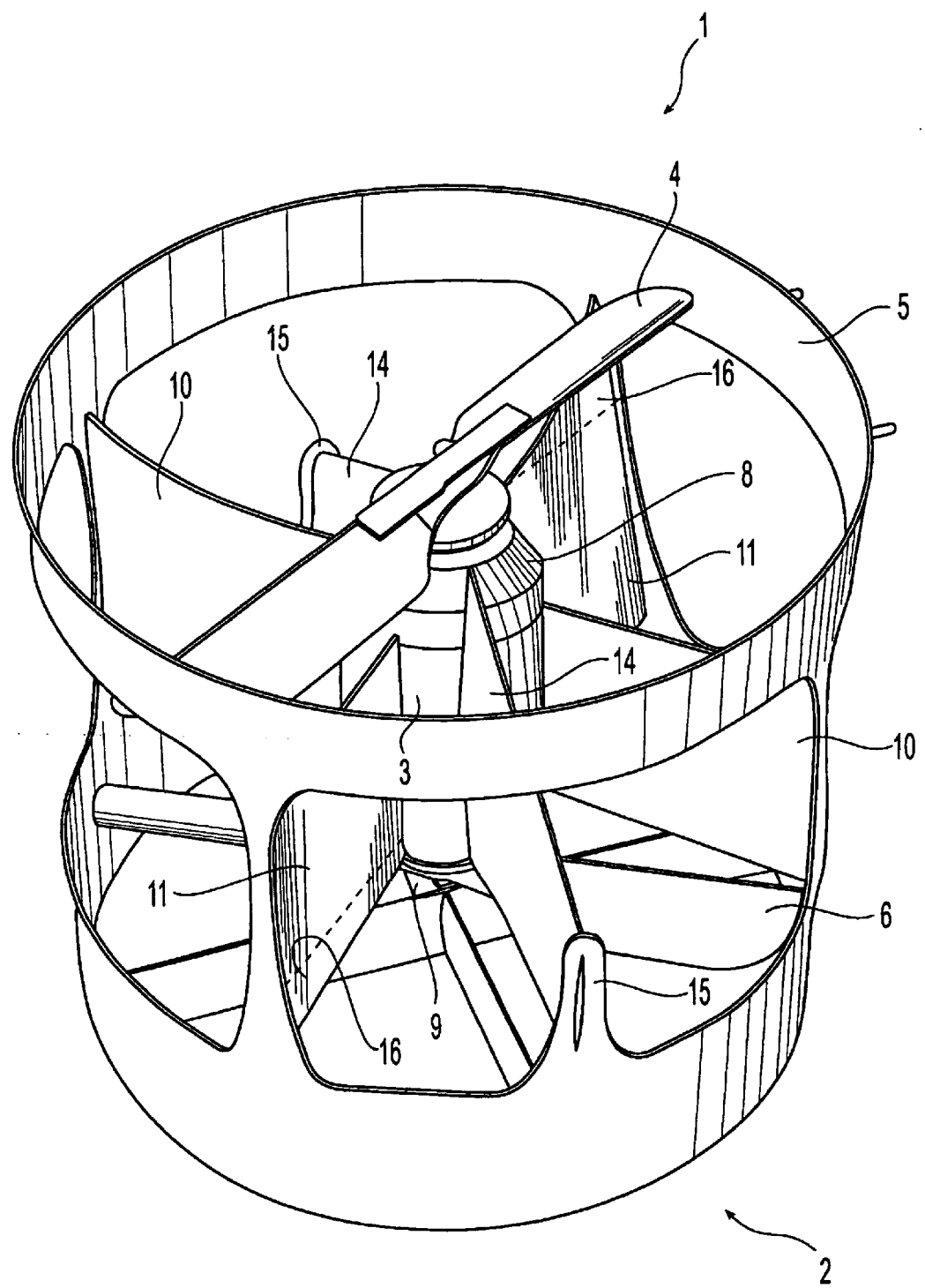
FIG. 4 shows a variation of FIG. 1.

In addition to the X configuration, the wing system 13 can also provide for the insertion of at least a pair of additional wing profiles, in the manner designated with the reference number 14 in the variation of FIG. 4 in which identical or similar parts to those described above are designated with the same numerical references. The additional wing profiles 14 are interposed between the profiles 10 and 11 and connect the fuselage 3 with axial appendages 15 of the cowling 7 of the second ducted rotor 2.

To assure complete control in flight, the micro-aircraft according to the invention is provided with a control system constituted by directional flaps. In the case of the embodiments illustrated in the drawings said flaps, designated with the reference number 16, are provided in correspondence with the wing profiles 11, according to two alternative or combined possibilities: in the area near the first ducted rotor 1 and/or in the area near the second ducted rotor 2. In both cases the flaps 16 act in such a way as to modify the air flows produced by the first propeller 4: during take off, when the aircraft is positioned with its axis vertical, the flaps 16 are fully lowered so the airflows exiting the first ducted rotor 1 are deviated towards the ground, generating a considerable ground effect, able to lift the aircraft even in the presence of a low speed of advance, which may even be nil at the instant of take off.

According to a variation not shown herein, one or more flaps 16 can also be provided in correspondence with a sunburst-like structure 18 borne by the cowling 7 of the second ducted rotor 2 below the associated propeller 6. In this case, the operating principle corresponds to the one described with reference to the flaps 16, but in relation to the airflow exiting the propeller 16 which is thus fully deviated towards the ground, thereby generating the desired ground effect.

In either case, control over the flaps 16 is independent, to enable controlling aircraft heading at all times.

Figure 5:
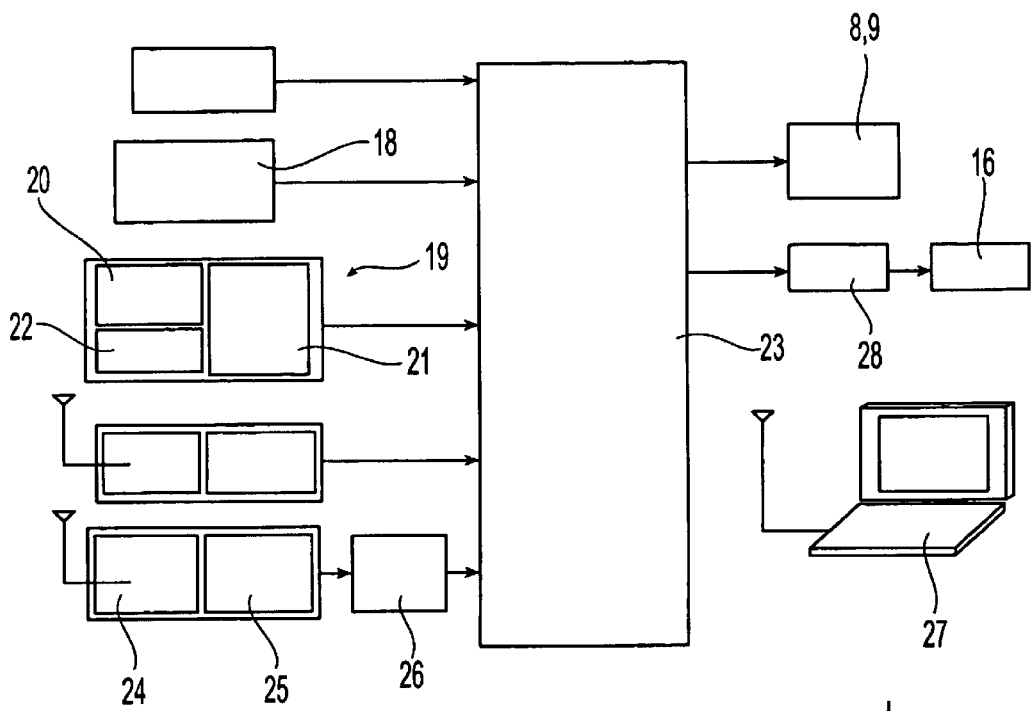
FIG. 5 is a block diagram showing an electronic control apparatus which can normally be installed aboard the micro-aircraft.

The operation of the flaps 16, and of the motors or engines 8 and 9, is controlled by an electronic system, which, as previously described, is housed within the fuselage 3 and whose block diagram is shown in FIG. 5. Said electronic system can be powered by means of batteries and/or fuel cells and/or solar cells, designated by the block 18, and it serves the purpose of assuring stability and control, of enabling the operation of the various installed sensors and to receive and transmit data from and to the ground.

To manage stability and control, the electronic system is operatively connected to a group of inertial navigation sensors 19 including gyroscopes and accelerometers 20, magnetic sensors 21 built with MEMS technology, and GPS receivers 22. The data provided by these sensors are analysed through a microprocessor 23 which provides the inputs for managing the propulsion units 8, 9 and the actuators of the control flaps 16. The aircraft can also house one or more television cameras 24, both traditional and infrared, whose sensors can be of the CMOS type or with photodiode matrices integrated with VLSI electronics. The television cameras also serve as a system for stabilising the aircraft by means of optical flow and CNN (Cellular Neural Network) techniques and as a collision prevention, altitude control system, etc. The television cameras also serve to record images and video, compressed with MPEG devices 26, on a recorder 25.

The electronic system must be able to manage data communication with a remote base station, schematically indicated as 27, and with other aircraft: said communication advantageously takes place in radio frequency.

For the actuators of the control flaps 16, indicated by the block 28 in FIG. 5, conventional transmission systems can be used or, more advantageously, active materials of the shape memory type. The latter materials are able, as is well known, to modify their mechanical characteristics if stimulated from the exterior with electrical, thermal, magnetic signals, etc. By way of example, for the actuation of the flap 16 of the micro-aircraft according to the invention SMA (Shaped Memory Alloy) wires were used, with a diameter of 200 µm and actuation times in the order of a millisecond.

The aircraft according to the invention can be built from several innovative materials. An example consists of composite carbon fiber materials, able to offer greater structural rigidity and more limited weight than do traditional materials such as aluminium or titanium. By way of example, matrices of structural polyurethane with Kevlar fibers can have a density of less than 0 g/cm$^3$ and for thickness of 1 mm, a weight of 0.2 kg per m$^2$.

Figure 6:
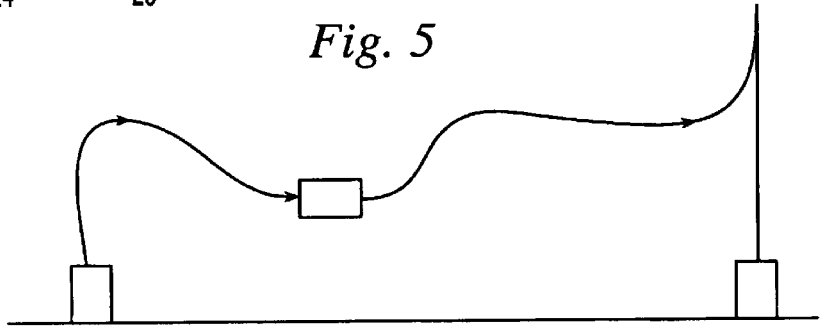
FIGS. 6 and 7 are two diagrams showing two different VTOL operating modes of the micro-aircraft according to the invention.

The micro-aircraft according to the invention is able to operate in two VTOL (Vertical Take Off and Landing) modes: the first one, exemplified in FIG. 6, provides for a vertical take off and a transitory for a passage to horizontal flight or full control while hovering (like a helicopter). This mode allows to exploit the ground effect of the ducted rotors 1, 2 during take off.

Figure 7:
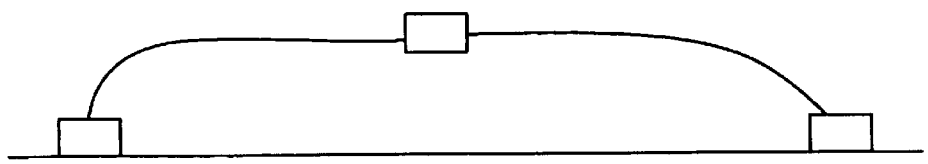

The second mode, schematically shown in FIG. 7, provides for a horizontal take off and requires no transitory: this mode is more advantageous in terms of energy required from the engines or motors 8,9 because the lift of the profiles 10, 11, and, if provided, 14, is exploited as well as that of the flaps 16, which, during take off, will be fully lowered.

The VTOL take off mode is assured by the fact that the ducted rotors 1, 2 cause air to flow on the wings 10, 11 and, if provided, 14 at high speed. The aircraft is kept motionless until power reaches and exceeds total weight. On take off, the aircraft is released and a horizontal thrust is added to the vertical thrust.

The invention has proved particularly advantageous in the case of micro-aircraft of maximum dimensions smaller than 150 mm, but it can also be extended to UAV (Unmanned Air Vehicle) systems with dimensions of up to 1000 mm.

The possible uses of the micro-aircraft according to the invention are many: it can be used for urban traffic monitoring, for testing the threshold for dust or sound pollution, for mapping roads and buildings. It can also be used as an element for guarding closed spaces during the day and night, as well as for guarding industrial plants, for instance nuclear plants, chemical and biotechnological facilities.

In the rescue field, the micro-aircraft according to the invention can be used instead of people inside smoke or gas saturated spaces to check for the presence of persons or things. It can also be advantageously employed in monitoring civil structures such as bridges, buildings, skyscrapers, monuments, hard-to-access structures, minefields, craters, rocky terrain. Furthermore, the micro-aircraft according to the invention can be used in the crime surveillance field, and in particular critical situations (for instance, the presence of hostages). Lastly, it can be used to search for missing persons in impervious areas, tunnels, natural disaster sites, as well as in the field of mass communication.

Naturally, construction details and embodiments may be widely changed from what is described and illustrated herein, without thereby departing from the scope of the present invention as defined in the claims that follow.

What is claimed is:

1. Vertical Take-Off and Landing micro-aircraft comprising:
   a first ducted rotor and a second ducted rotor mutually aligned and distanced according to a common axis and each including a propeller rotatable within a respective annular cowling,
   a fuselage positioned along said common axis between said first and second rotors and bearing said propellers at opposite ends of the fuselage,
   first and second motorised means positioned at said ends of the fuselage to drive the propellers of said first and second rotor in mutually opposite directions of rotation,
   a wing system positioned radially between said fuselage and baffle plates connected between the cowlings of said first and second rotors, and
   control means.

2. Micro-aircraft as claimed in claim 1, wherein said wing system includes wing profiles forming a substantially X shaped configuration.

3. Micro-aircraft as claimed in claim 2, further comprising an additional wing profile (14) positioned within said X configuration.

4. Micro-aircraft as claimed in claim 2, wherein said wing profiles are hollow.

5. Micro-aircraft as claimed in any of the claim 4, wherein said wing profiles interconnect said fuselage and said annular cowlings of said first and second rotor.

6. Micro-aircraft as claimed in claim 2, wherein said control means include directional flaps applied to said wing profiles in proximity to said first ducted rotor and/or in proximity to said second ducted rotor.

7. Micro-aircraft as claimed in claim 1, wherein said fuselage is designed to house means for powering said motorised means and a system for managing said motorised means and said control means with an inertial navigation system associated thereto.

8. Micro-aircraft as claimed in claim 1, wherein said propellers have different profiles.

9. Micro-aircraft as claimed in claim 1, wherein said motorised means include for each ducted rotor at least an electric motor.

10. Micro-aircraft as claimed in claim 1, wherein said motorised means include for each ducted rotor at least a micro-combustor motor.

11. Micro-aircraft as claimed in claim 1, wherein said wing system includes wing profile forming a substantially H shaped configuration.

* * * * *